United States Patent
Wu (10) Patent No.: US 10,595,357 B2
(45) Date of Patent: Mar. 17, 2020

(54) DEVICE AND METHOD OF HANDLING PACKET ROUTING

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 75 days.

(21) Appl. No.: 16/118,444

(22) Filed: Aug. 31, 2018

(65) Prior Publication Data

US 2019/0069335 A1 Feb. 28, 2019

Related U.S. Application Data

(60) Provisional application No. 62/553,112, filed on Aug. 31, 2017.

(51) Int. Cl.

| | |
|---|---|
| *H04W 4/00* | (2018.01) |
| *H04W 76/20* | (2018.01) |
| *H04L 12/747* | (2013.01) |
| *H04W 28/02* | (2009.01) |
| *H04L 12/00* | (2006.01) |

(52) U.S. Cl.
CPC .............. *H04W 76/20* (2018.02); *H04L 12/00* (2013.01); *H04L 45/742* (2013.01); *H04W 28/0252* (2013.01)

(58) Field of Classification Search
CPC . H04W 76/20; H04W 28/0252; H04W 76/19; H04W 40/24; H04W 40/02; H04L 12/00; H04L 45/742; H04L 45/304
USPC .......................................... 370/329, 330, 328
See application file for complete search history.

(56) References Cited

U.S. PATENT DOCUMENTS

| | | | |
|---|---|---|---|
| 8,717,945 | B2 | 5/2014 | Burckart |
| 2014/0056243 | A1 | 2/2014 | Pelletier |
| 2016/0285716 | A1* | 9/2016 | Pelletier ............ H04W 74/0833 |

(Continued)

FOREIGN PATENT DOCUMENTS

| | | |
|---|---|---|
| CN | 101951689 B | 7/2013 |
| CN | 103297947 A | 9/2013 |
| CN | 107079375 A | 8/2017 |

(Continued)

OTHER PUBLICATIONS

3GPP TS 37.340 V0.2.1 (Aug. 2017).

(Continued)

*Primary Examiner* — Chuong T Ho
(74) *Attorney, Agent, or Firm* — Winston Hsu (57) ABSTRACT

A communication device receiving a first radio resource control (RRC) Reconfiguration message from a base station (BS) on a signaling radio bearer (SRB), wherein the first RRC Reconfiguration message configures a first data radio bearer (DRB) and configures a local cache routing configuration; receiving a second RRC Reconfiguration message from the BS on the SRB, wherein the second RRC Reconfiguration message configures a second DRB; transmitting a first protocol data unit (PDU) to the BS on the first DRB, wherein the communication device indicates a local cache routing in a PDU header of the first PDU when the local cache routing configuration is configured by the BS; transmitting a second PDU to the BS on the second DRB, wherein the communication device does not indicate the local cache routing in the second PDU.

10 Claims, 6 Drawing Sheets

(56) References Cited

U.S. PATENT DOCUMENTS

2018/0278357 A1* 9/2018 Kim .................... H04J 11/0076

FOREIGN PATENT DOCUMENTS

| EP | 2 695 361 B1 | 1/2016 |
| WO | 2014/075210 A1 | 5/2014 |
| WO | 2017/073844 A1 | 5/2017 |

OTHER PUBLICATIONS

Search Report dated Feb. 12, 2019 for EP application No. 18191827.7, pp. 14.
Notice of Allowance dated Apr. 23, 2019 for the Taiwan application No. 107130676, filed Aug. 31, 2018, pp. 1~4.

* cited by examiner

DEVICE AND METHOD OF HANDLING PACKET ROUTING

CROSS REFERENCE TO RELATED APPLICATIONS

This application claims the benefit of U.S. Provisional Application No. 62/553,112 filed on Aug. 31, 2017, which is incorporated herein by reference.

BACKGROUND OF THE INVENTION

1. Field of the Invention

The present invention relates to a communication device and a method used in a wireless communication system, and more particularly, to a communication device and a method of handling a packet routing.

2. Description of the Prior Art

A user equipment (UE) may request a packet routing to a base station (BS), and may receive a packet routing configuration from the BS. However, it is unknown how (when) the UE performs a packet routing according to the packet routing configuration. Thus, how to handle the packet routing is an important problem to be solved.

SUMMARY OF THE INVENTION

The present invention therefore provides a method and related communication device for handling a packet routing to solve the abovementioned problem.

A communication device communicating with a base station (BS) on a signaling radio bearer (SRB); receiving a first radio resource control (RRC) Reconfiguration message from the BS on the SRB, wherein the first RRC Reconfiguration message configures a first data radio bearer (DRB) and configures a local cache routing configuration; receiving a second RRC Reconfiguration message from the BS on the SRB, wherein the second RRC Reconfiguration message configures a second DRB; transmitting a first protocol data unit (PDU) to the BS on the first DRB, wherein the communication device indicates a local cache routing in a first PDU header of the first PDU when the local cache routing configuration is configured by the BS; transmitting a second PDU to the BS on the second DRB, wherein the communication device does not indicate the local cache routing in the second PDU.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
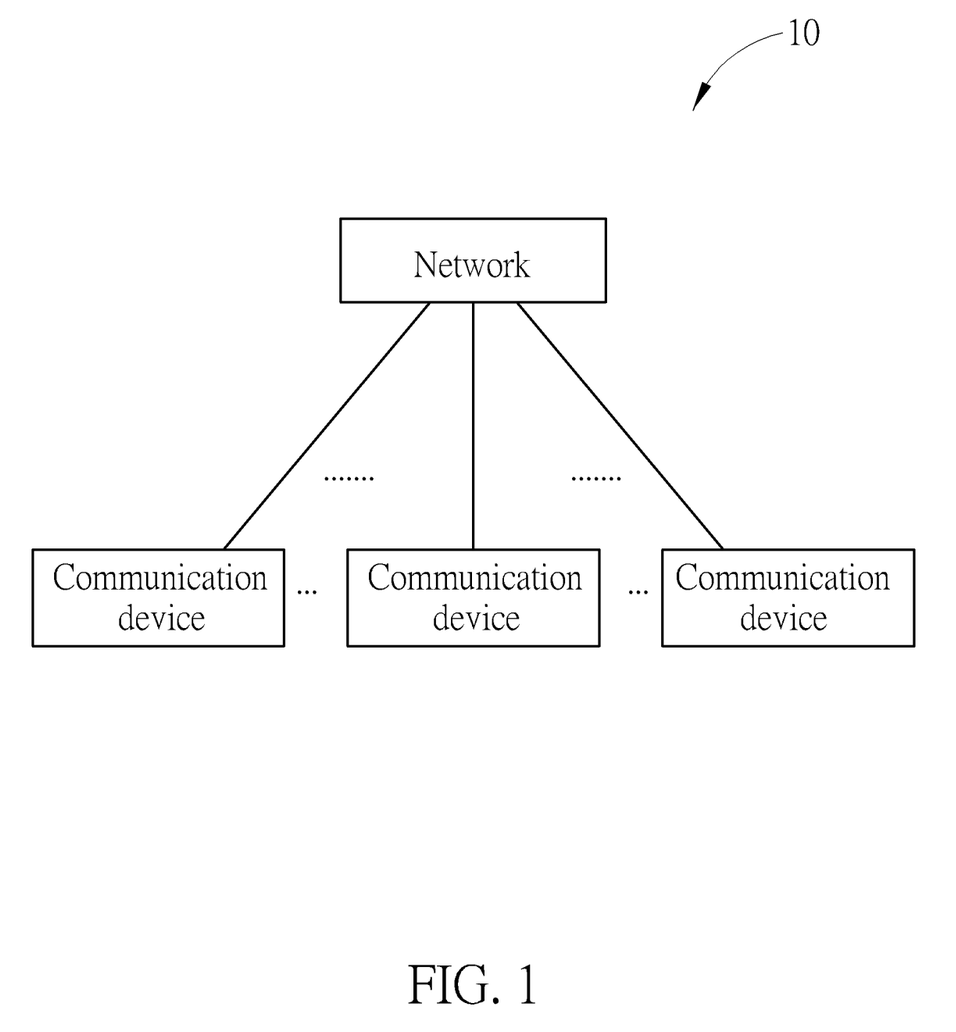
FIG. 1 is a schematic diagram of a wireless communication system according to an example of the present invention.

In FIG. 1, a wireless communication system 10 is briefly composed of a network and a plurality of communication devices. The network and the communication device may (e.g., simultaneously) communicate with each other via one or multiple cells including a primary cell (PCell) and one or more secondary cells (SCells).

Practically, the network in FIG. 1 comprises a radio access network (RAN) and a core network (CN). The RAN comprises at least one base station (BS). The CN comprises at least one CN node. The at least one BS may comprise an evolved Node-B (eNB), a next generation Node-B (gNB), a next generation eNB (ng-eNB) or a sixth generation (6G) BS. The at least one CN node may comprise a Mobility Management Entity (MME), a serving gateway (SGW), an Access and Mobility Management Function (AMF), a Session Management Function (SMF), a User Plane Function (UPF) or a 6G CN node. The 6G radio communication technology may employ orthogonal frequency-division multiplexing (OFDM) and/or non-OFDM supporting a larger bandwidth than 5G radio communication technology.

A communication device may be a user equipment (UE), a NB-IoT UE, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a uplink (UL), the communication device is the transmitter and the network is the receiver, and for a downlink (DL), the network is the transmitter and the communication device is the receiver.

Figure 2:
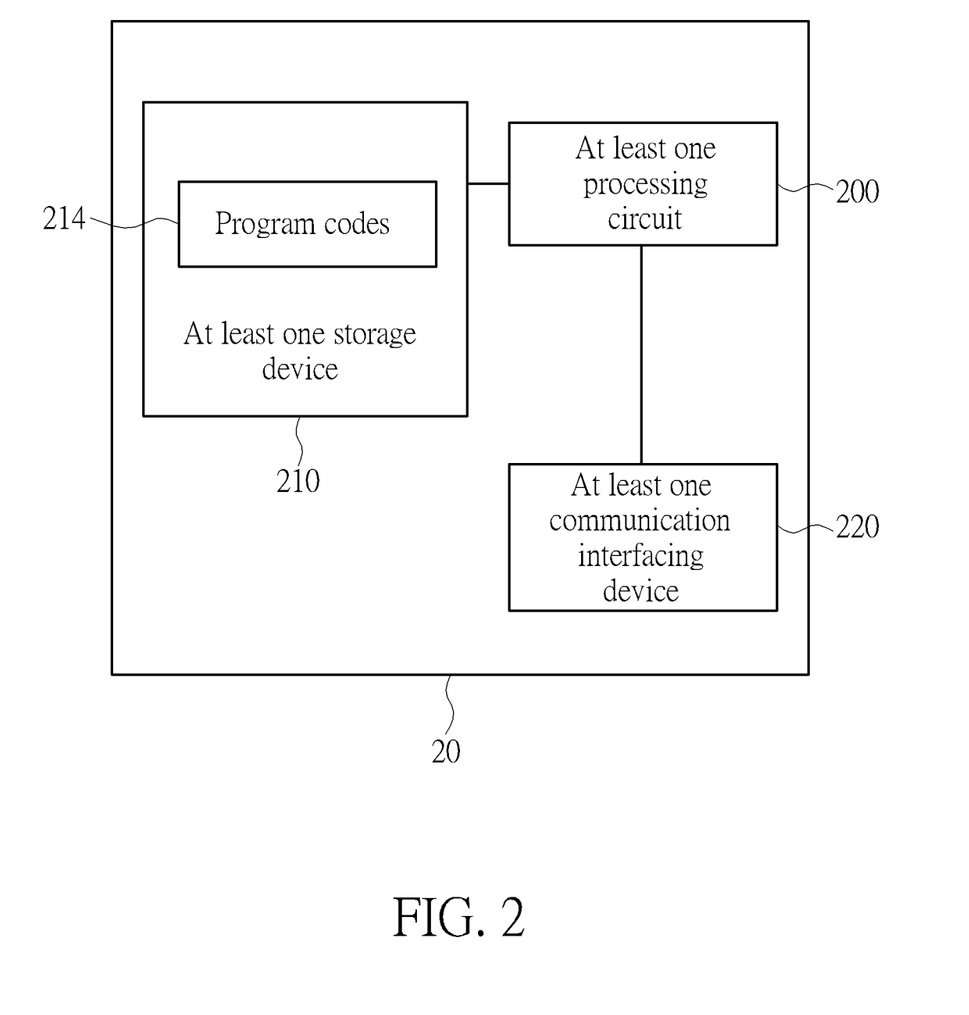
FIG. 2 is a schematic diagram of a communication device according to an example of the present invention.

FIG. 2 is a schematic diagram of a communication device 20 according to an example of the present invention. The communication device 20 may be the communication device shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
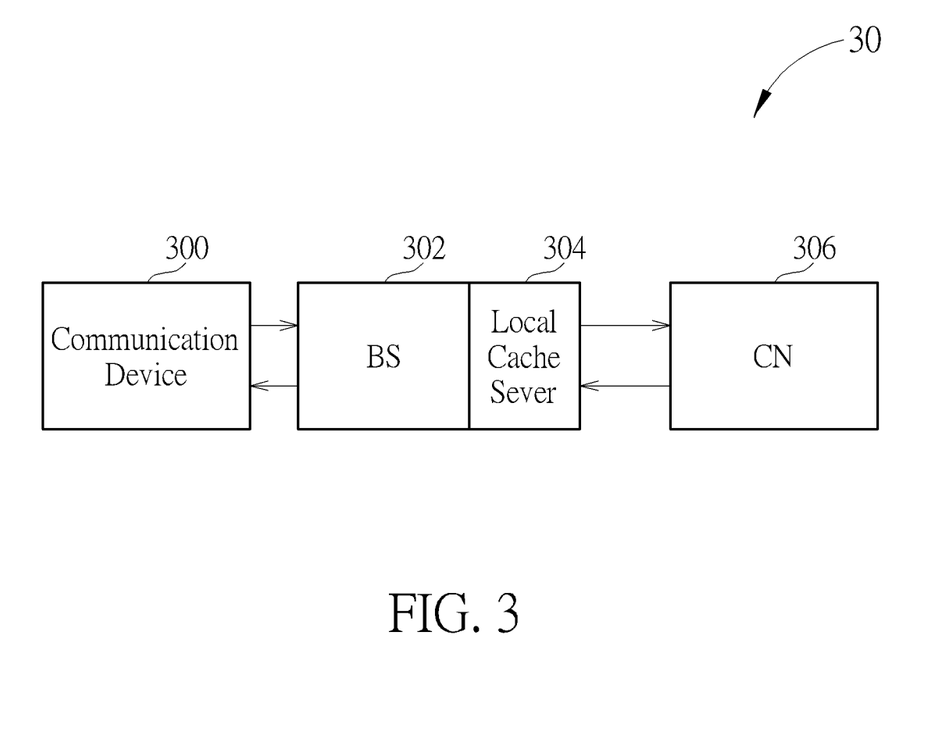
FIG. 3 is a schematic diagram of a local cache server co-located with a base station according to an example of the present invention.

FIG. 3 is a schematic diagram of a local cache server co-located with a base station according to an example of the present invention. In FIG. 3, a wireless communication system 30 is briefly composed of a communication device 300, a BS 302, a local cache server 304, and a CN 306. The wireless communication system 30 may be used for realizing the wireless communication system 10, i.e., the communication device 300 may be the communication device in FIG. 1, and the BS 302, the local cache server 304 and the CN 306 may be located in the network in FIG. 1. In FIG. 3, the local cache server 302 is co-located (e.g., located jointly or together) with the BS 302.

Figure 4:
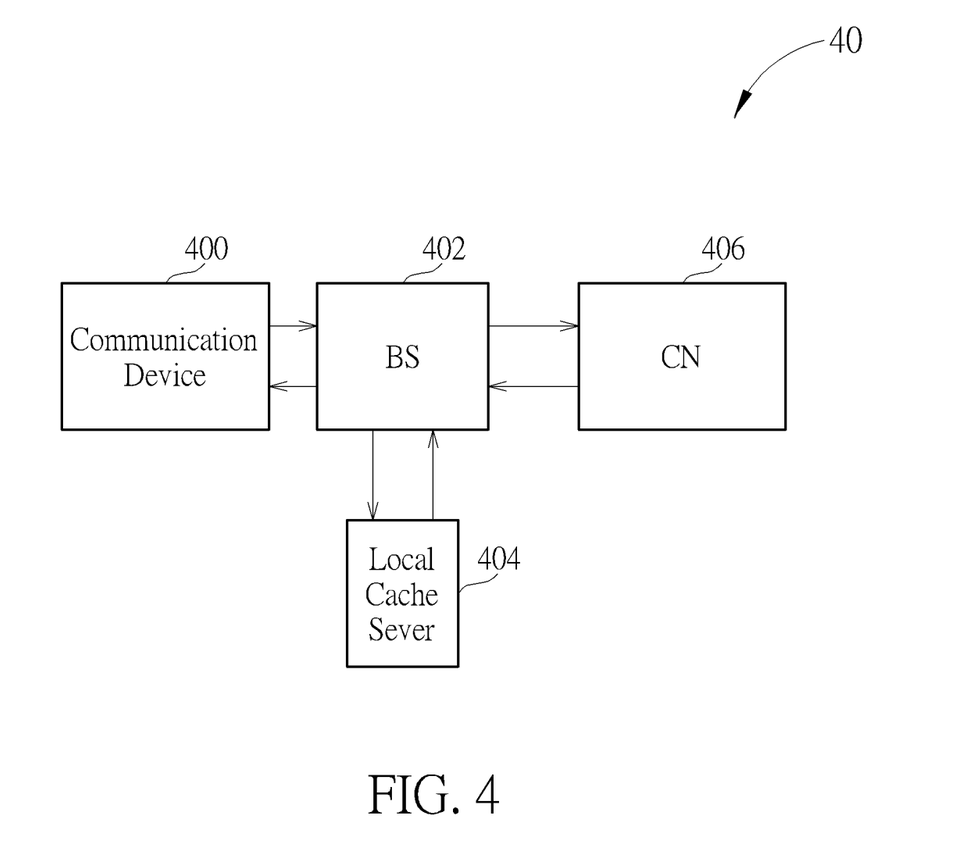
FIG. 4 is a schematic diagram of a local cache server connected to a base station according to an example of the present invention.

FIG. 4 is a schematic diagram of a local cache server connected to a base station according to an example of the present invention. In FIG. 4, a wireless communication system 40 is briefly composed of a communication device 400, a BS 402, a local cache server 404, and a CN 406. The wireless communication system 40 may be used for realizing the wireless communication system 10, i.e., the communication device 400 may be the communication device in FIG. 1, and the BS 402, the local cache server 404 and the CN 406 may be located in the network shown in FIG. 1. In FIG. 4, the local cache server 402 is connected (e.g., directly or indirectly) to the BS 402. The BS 402 and the local cache server 404 may communicate with each other via transmission(s)/reception(s) of packet(s).

In the following examples, a UE is used for representing the communication device shown in FIG. 1, to simplify the illustration of the embodiments.

Figure 5:
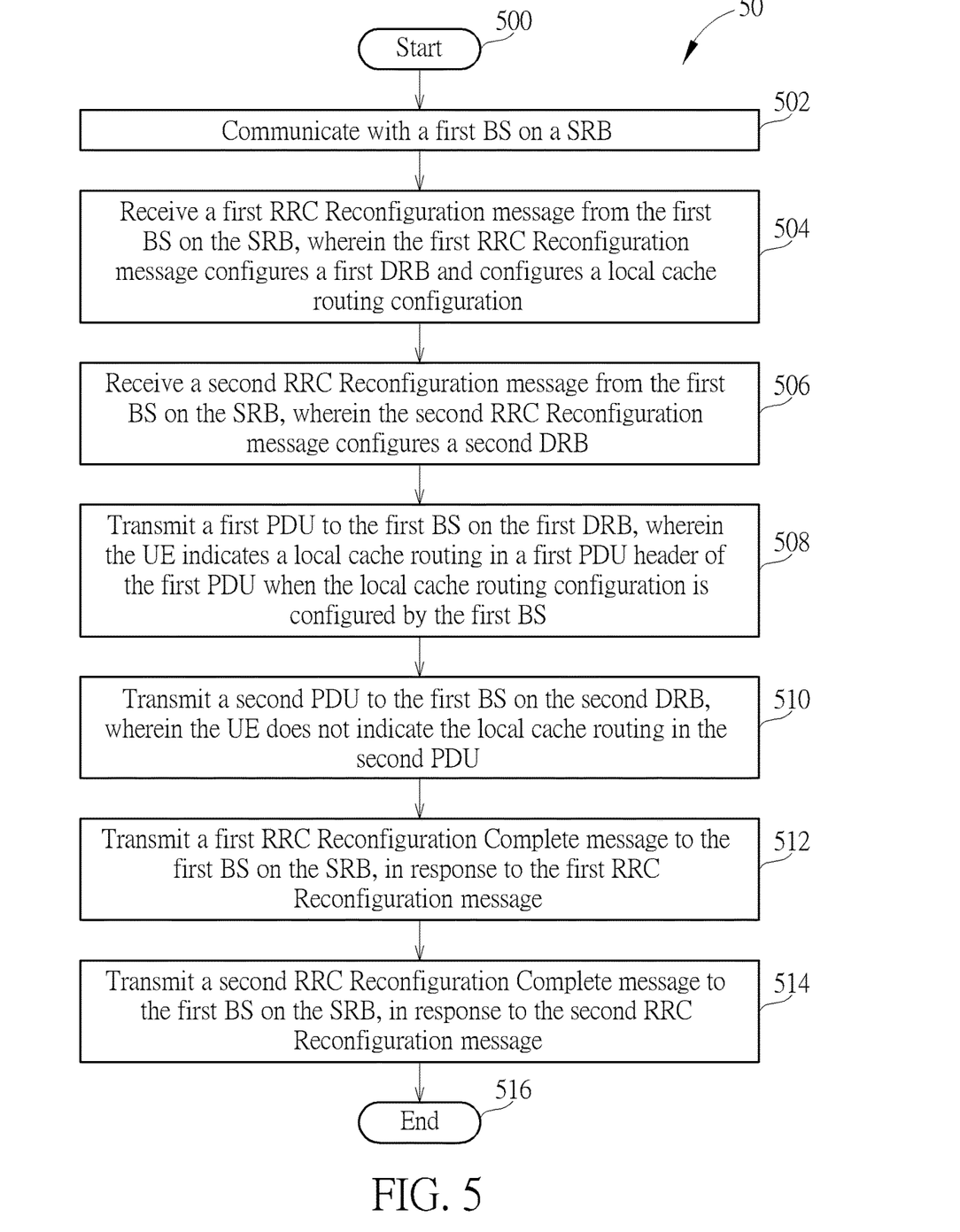
FIG. 5 is a flowchart of a process according to an example of the present invention.

A process 50 in FIG. 5 according to an example of the present invention may be utilized in a UE, and includes the following steps:

Step 500: Start.

Step 502: Communicate with a first BS on a signaling radio bearer (SRB).

Step 504: Receive a first radio resource control (RRC) Reconfiguration message from the first BS on the SRB, wherein the first RRC Reconfiguration message configures a first data radio bearer (DRB) and configures a local cache routing configuration.

Step 506: Receive a second RRC Reconfiguration message from the first BS on the SRB, wherein the second RRC Reconfiguration message configures a second DRB.

Step 508: Transmit a first protocol data unit (PDU) to the first BS on the first DRB, wherein the UE indicates a local cache routing in a first PDU header of the first PDU when the local cache routing configuration is configured by the first BS.

Step 510: Transmit a second PDU to the first BS on the second DRB, wherein the UE does not indicate the local cache routing in the second PDU.

Step 512: Transmit a first RRC Reconfiguration Complete message to the first BS on the SRB, in response to the first RRC Reconfiguration message.

Step 514: Transmit a second RRC Reconfiguration Complete message to the first BS on the SRB, in response to the second RRC Reconfiguration message.

Step 516: End.

In one example, the UE indicates the local cache routing in the first PDU and does not indicate the local cache routing in the second PDU, when the local cache routing configuration is configured by the first BS. In one example, the UE determines whether to indicate the local cache routing in the PDU by itself, even if the local cache routing configuration is (e.g., has been) configured by the first BS. For example, the UE determines to indicate the local cache routing for the first DRB according to a first property of the first DRB. For example, the first property of the first DRB is used for exchanging data of internet services (e.g., web browsing, ftp, video streaming or net TV service). The video streaming or the net TV service may include Netflix, YouTube, YouKu, TuDou or etc. In one example, the UE determines not to indicate the local cache routing for the second DRB according to a second property of the second DRB, which is different from the first property of the first DRB. For example, the second property of the second DRB is used for transmitting and/or receiving Internet Protocol (IP) Multimedia Subsystem (IMS) signaling and/or IMS data. The IMS signaling may include Session Initiation Protocol (SIP) messages. The IMS data may include Real-time Transport Protocol (RTP) packets, which include voice packets.

In another example, the local cache routing configuration is associated with the first DRB and is not associated with the second DRB. That is, the first BS configures the local cache routing configuration for the first DRB and does not configure the local cache routing configuration for the second DRB. Accordingly, the UE uses the local cache routing configuration for PDUs transmitted on the first DRB to the first BS in response to the first RRC Reconfiguration message, but the UE does not use the local cache routing configuration for PDUs transmitted on the second DRB in response to the second RRC Reconfiguration.

In one example, the first BS configures (e.g., determines to configure) the local cache routing configuration for the first DRB according to the first property of the first DRB. In one example, the first BS does not configure (e.g., determines not to configure) the local cache routing configuration for the second DRB according to the second property of the second DRB. The first and second properties are as described above.

In one example, the second RRC Reconfiguration message configures the second DRB for the IMS signaling and configures a third DRB for transmitting and/or receiving the IMS data. The second RRC Reconfiguration message may not configure the local cache routing configuration associated with the third DRB.

The first PDU includes the first PDU header and a first data field. The first data field includes a first packet. The second PDU includes a second PDU header and a second data field. The second data field of the second PDU includes a second packet. The UE indicates the local cache routing in the first PDU header, when the local cache routing configuration is configured by the first BS and the UE determines the first packet to be routed by the first BS to a local cache server (e.g., the local cache sever 304 in FIG. 3 or the local cache server 404 in FIG. 4). The first BS transmits the first packet to the local cache server according to the local cache routing indicated in the first PDU header. The UE does not indicate the local cache routing in the second PDU header, when the local cache routing configuration is configured by the first BS and the UE determines the second packet not to be routed by the first BS to the local cache server. The first BS transmits the second packet to a CN (e.g., the CN 306 in FIG. 3 or the CN 406 in FIG. 4) instead of the local cache server.

In one example, the UE transmits a third PDU to the first BS on the first DRB, wherein the UE does not indicate the local cache routing in the third PDU when the local cache routing configuration is configured by the first BS. A third data field of the third PDU includes a third packet. When the first BS receives the third PDU, the first BS transmits the third packet to the CN (e.g., a SGW or a UPF) instead of the local cache server according to the third PDU header. In one example, the UE does not indicate (e.g., determines not to indicate) the local cache routing for the third packet in the third PDU (or in the third PDU header), when the UE determines the third packet to be routed to the CN.

In one example, the UE includes a local cache routing request in a RRC message (e.g., an existing RRC message or a new RRC message) transmitted to the first BS on the SRB, before receiving the first RRC Reconfiguration message. The first BS may configure the local cache routing configuration, in response to the local cache routing request. For example, the RRC message is a RRC Connection Setup Complete message, the RRC Reconfiguration Complete message, a Security Mode Complete message or a UE Assistance Information message.

In one example, the UE transmits a UE capability information indicating a support of the local cache routing configuration to the first BS, before receiving the first RRC Reconfiguration message. In another example, the first BS receives the UE capability information from the CN (e.g., a MME or an AMF) or a second BS, before transmitting the first RRC Connection message to the UE. The first BS configures the local cache routing configuration, in response to the indication of the support of the local cache routing configuration in the UE capability information.

Figure 6:
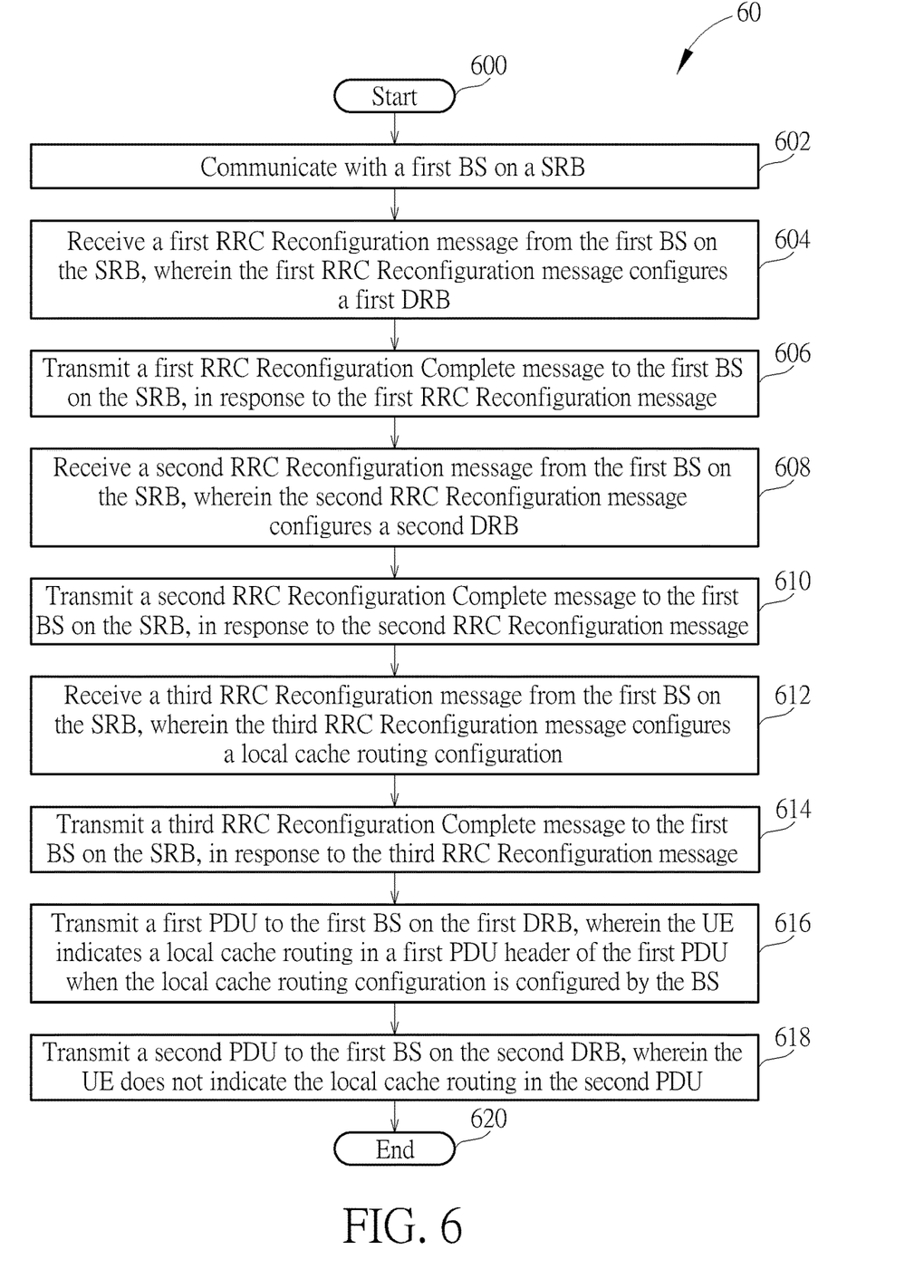
FIG. 6 is a flowchart of a process according to an example of the present invention.

A process 60 in FIG. 6 according to an example of the present invention may be utilized in a UE, and includes the following steps:

Step 600: Start.
Step 602: Communicate with a first BS on a SRB.
Step 604: Receive a first RRC Reconfiguration message from the first BS on the SRB, wherein the first RRC Reconfiguration message configures a first DRB.
Step 606: Transmit a first RRC Reconfiguration Complete message to the first BS on the SRB, in response to the first RRC Reconfiguration message.
Step 608: Receive a second RRC Reconfiguration message from the first BS on the SRB, wherein the second RRC Reconfiguration message configures a second DRB.
Step 610: Transmit a second RRC Reconfiguration Complete message to the first BS on the SRB, in response to the second RRC Reconfiguration message.
Step 612: Receive a third RRC Reconfiguration message from the first BS on the SRB, wherein the third RRC Reconfiguration message configures a local cache routing configuration.
Step 614: Transmit a third RRC Reconfiguration Complete message to the first BS on the SRB, in response to the third RRC Reconfiguration message.
Step 616: Transmit a first PDU to the first BS on the first DRB, wherein the UE indicates a local cache routing in a first PDU header of the first PDU when the local cache routing configuration is configured by the BS.
Step 618: Transmit a second PDU to the first BS on the second DRB, wherein the UE does not indicate the local cache routing in the second PDU.
Step 620: End.

In one example, the UE indicates the local cache routing in the first PDU and does not indicate the local cache routing in the second PDU, when the local cache routing configuration is configured by the first BS.

The examples described above for the process 50 may be applied to the process 60 and are not repeated herein. The following examples may be applied to the processes 50-60.

In one example, the UE transmits a RRC message to the first BS on the SRB, wherein the RRC message indicates a support of the local cache routing configuration or includes a local cache routing request. The first BS transmits the local cache routing configuration, in response to the support of the local cache routing configuration or the local cache routing request. The UE receives the local cache routing configuration, after the UE transmits the support of the local cache routing configuration or the local cache routing request to the first BS.

In one example, the first BS configures the local cache routing configuration, in response to the RRC message. For example, the RRC message is the RRC Connection Request message, the RRC Connection Setup Complete message, the RRC Reconfiguration Complete message, a Security Mode Complete message, a UE Assistance Information message, a UE Capability Information or a new RRC message.

The following examples may be applied to the processes above.

In one example, the UE transmits a first control PDU to the first BS on the first DRB, to request the local cache routing, when the local cache routing configuration is configured by the first BS and the UE determines to request the local cache routing. The UE receives a second control PDU for responding to the first control PDU from the first BS on the first DRB, wherein the first BS transmits the second control PDU to the UE, to accept the local cache routing requested by the UE. The UE indicates the local cache routing in the first PDU header of the first PDU for the first DRB when/after the UE receives the second control PDU. In another example, the UE transmits a third control PDU to the first BS on the first DRB, to inform the first BS of activating the local cache routing, when the local cache routing configuration is configured by the first BS and the UE determines to activate the local cache routing. The UE indicates the local cache routing in the first PDU header of the first PDU for the first DRB when/after the UE transmits the third control PDU.

In one example, the first BS transmits at least one of the indication of the support of the local cache routing configuration, the local cache routing request and the local cache routing configuration to a third BS in a Handover Request message for a handover preparation for the UE. The third BS transmits a Handover Request Acknowledge message in response to the Handover Request message. The Handover Request Acknowledge message includes a handover command (e.g., a RRC Reconfiguration message). The third BS determines whether to keep the local cache routing configuration or not. The third BS indicates the UE whether to keep the local cache routing configuration or not in the handover command according to the determination. Then, the first BS transmits (e.g., forward) the handover command to the UE, to command the UE to hand over to the third BS. When the UE connects to the third BS, the UE transmits a handover complete message (e.g., a RRC Reconfiguration Complete message) to the third BS.

The UE keeps or releases the local cache routing configuration according to the handover command. The UE releases the local cache routing configuration in response to the handover command, if the handover command indicates that the UE to release the local cache routing configuration. The UE may transmit a RRC message to the third BS on the SRB to request the local cache routing, e.g., when the UE determines to request the local cache routing. The RRC message may include a local cache routing request. The UE may receive a fourth RRC Reconfiguration message from the third BS on the SRB, wherein the fourth RRC Reconfiguration message configures the local cache routing configuration. The UE may transmit a fourth RRC Reconfiguration Complete message to the third BS on the SRB, in response to the fourth RRC Reconfiguration message. The UE may perform steps 508 and 510 or steps 616 and 618 with the third BS instead of the first BS.

In one example, if the first BS is a secondary node (SN) (e.g., Secondary gNB (SgNB) or Secondary eNB (SeNB)), the first BS may transmit at least one of the indication of the support of the local cache routing configuration, the local cache routing request and the local cache routing configuration in a first SN message (e.g., a SN Addition Request Acknowledge message, a SN Modification Request Acknowledge message, a SN Modification Required message, a SN Change Required message or a SN Release Required message) for the UE to a fourth BS (e.g., Master Node, e.g., a Master eNB (MeNB) or a Master gNB (MgNB)). The fourth BS may transmit a second SN message (e.g., a SN Addition Request message) to a fifth BS (e.g., a new SN). The second SN message may include the at least one of the indication of the support of the local cache routing configuration, the local cache routing request and the local cache routing configuration. The fifth BS may transmit a third SN message (e.g., a SN Addition Request Acknowledge message) including a SCG configuration or a SN RRC Reconfiguration message) to the fourth BS, in response to the second SN message. The fifth BS determines whether to keep the local cache routing configuration or not. The fifth BS may indicate the UE whether to keep the local cache routing configuration or not in the SCG configuration or in the SN RRC Reconfiguration message according to the determination. Then, the fourth BS transmits the SN RRC Reconfiguration message to the UE, to command the UE to connect to the fifth BS. The UE transmits a SN RRC Reconfiguration Complete message to the fourth BS, in response to the SN RRC Reconfiguration message.

The UE may receive the SN RRC Reconfiguration message changing the UE from connecting to the first BS to connecting to the fifth BS (i.e., in dual connectivity (DC) with the fifth BS and the fourth BS), from the first BS, when the UE communicates with the first BS and the fourth BS (i.e., in DC with the first BS and the fourth BS). The UE keeps or releases the local cache routing configuration according to (or in response to) the SN RRC Reconfiguration message. For example, the UE releases the local cache configuration in response to the SN RRC Reconfiguration message, if the SN RRC Reconfiguration message indicates to release the local cache configuration. The UE keeps the local cache configuration in response to the SN RRC Reconfiguration message, otherwise. The UE may transmit a RRC message to request the local cache routing to the fifth BS on the SRB, wherein the third RRC message includes a local cache routing request. The UE may receive a SN RRC Reconfiguration message from the fifth BS on the SRB, wherein the SN RRC Reconfiguration message configures a local cache routing configuration. The UE transmits a SN RRC Reconfiguration Complete message to the fifth BS on the SRB, in response to the SN RRC Reconfiguration message. The UE may perform steps 616 and 618 with the fifth BS instead of the first BS.

In one example, the UE performs (e.g., initiates) a RRC connection reestablishment procedure according to a failure (e.g., radio link failure, handover failure, integrity check failure or reconfiguration failure). The UE may release or keep the local cache routing configuration and suspends the first DRB, in response to the RRC connection reestablishment procedure or the failure. If the UE keeps the local cache routing configuration, the UE transmits a fourth PDU to the first BS on the first DRB according to the local cache routing configuration, after resuming the first DRB. The UE indicates the local cache routing in a PDU header of the fourth PDU, in response to the local cache routing configuration. If the UE releases the local cache routing configuration, the UE does not indicate the local cache routing in any PDU transmitted on the first DRB after resuming the first DRB. The UE may or may not release any Secondary Cell (SCell) configured to the UE, in response to the RRC connection reestablishment procedure or the failure. The UE resumes the first DRB when receiving a RRC Reconfiguration message, after the RRC connection reestablishment procedure.

In one example, the first BS configures the local cache routing configuration associated with the first DRB in a Service Data Adaption Protocol (SDAP) configuration of the first DRB, in a Packet Data Convergence Protocol (PDCP) configuration of the first DRB, or in a DRB configuration of the first DRB in the RRC Reconfiguration message described above.

In one example, the first BS configures the local cache routing configuration in none of the SDAP configuration, the PDCP configuration and the DRB configuration. That is, the local cache configuration is separated from the SDAP configuration, the PDCP configuration and the DRB configuration in the RRC Reconfiguration message. Thus, the UE may associate the local cache routing configuration with the first DRB according to the first property of the first DRB. The UE may not associate the local cache routing configuration with the second DRB according to the second property of the second DRB. The UE may not associate the local cache routing configuration with the third DRB according to a third property of the third DRB.

In one example, the first BS may configure the local cache routing configuration in a broadcast message (e.g., a system information block) instead of the RRC Reconfiguration message described above.

The PDUs described above may be SDAP PDUs or PDCP PDUs. At least one bit in a header of the SDAP PDU or in a header of the PDCP PDU may include the indication of the local cache routing.

The control PDUs described above may be SDAP control PDUs or PDCP Control PDUs. The first control PDU may or may not include packet flow information identifying a packet flow (e.g., IP flow or quality of service (QoS) flow). In one example, the packet flow information includes a flow identity. In one example, the packet flow information includes at least one of packet address(es), port number(s) and a protocol in use. The packet address(es) may be source/destination Medium Access Control (MAC) address(es) or source/destination IP address(es). The port number(s) may be source/destination port number(s). The first BS may further determine whether to allow the packet flow to be routed to the local cache server according to the packet flow information.

The term of "on the SRB/DRB" may be replaced by "associated with the SRB/DRB" or "via the SRB/DRB". The term of "configure" described above may be replaced by "enable". The term of "determine" described above may be replaced by "obtain" or "decide". The term of "in response to" described above may be replaced by "according to" or vice versa. The term of "packet" described above may be replaced by "IP packet". The term of "RRC Reconfiguration" above may be replaced by "RRC Connection Reconfiguration". The term of "transmit" above may be replaced by "send".

The new RRC message may be transmitted on the SRB1. A benefit of using the new RRC message or a UE Assistance Information message is that the UE can request the local cache routing at any time during a RRC CONNECTED mode, when the UE determines to request the local cache routing.

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214.

To sum up, the present invention provides a method and related communication device for handling a packet routing. A UE may perform a local cache routing according to a local cache routing configuration, when the local cache routing configuration is configured by a BS and the UE determines to request the local cache routing. Thus, the problem of handling the packet routing is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a packet routing, comprising:
   at least one storage device; and
   at least one processing circuit, coupled to the at least one storage device, wherein the at least one storage device stores, and the at least one processing circuit is configured to execute instructions of:
   communicating with a base station (BS) on a signaling radio bearer (SRB);
   receiving a first radio resource control (RRC) Reconfiguration message from the BS on the SRB, wherein the first RRC Reconfiguration message configures a first data radio bearer (DRB) and configures a local cache routing configuration;
   receiving a second RRC Reconfiguration message from the BS on the SRB, wherein the second RRC Reconfiguration message configures a second DRB;
   transmitting a first protocol data unit (PDU) to the BS on the first DRB, wherein the communication device indicates a local cache routing in a PDU header of the first PDU when the local cache routing configuration is configured by the BS;
   transmitting a second PDU to the BS on the second DRB, wherein the communication device does not indicate the local cache routing in the second PDU;
   transmitting a first RRC Reconfiguration Complete message to the BS on the SRB, in response to the first RRC Reconfiguration message; and
   transmitting a second RRC Reconfiguration Complete message to the BS on the SRB, in response to the second RRC Reconfiguration message.

2. The communication device of claim 1, wherein the instructions further comprise:
   indicating the local cache routing in the PDU header of the first PDU, when the local cache routing configuration is configured by the BS and the communication device determines a packet in a data field of the first PDU to be routed by the BS to a local cache server.

3. The communication device of claim 1, wherein the instructions further comprise:
   transmitting a third PDU to the BS on the first DRB, wherein the communication device does not indicate the local cache routing in the third PDU when the local cache routing configuration is configured by the BS and the communication device determines a packet in a data field of the third PDU to be routed by the BS to a core network.

4. The communication device of claim 1, wherein the instructions further comprise:
   transmitting a user equipment (UE) capability information indicating a support of the local cache routing configuration to the BS, before receiving the first RRC Reconfiguration message.

5. A communication device for handling a packet routing, comprising:
   at least one storage device; and
   at least one processing circuit, coupled to the at least one storage device, wherein the at least one storage device stores, and the at least one processing circuit is configured to execute instructions of:
   communicating with a first base station (BS) on a signaling radio bearer (SRB);
   receiving a first radio resource control (RRC) Reconfiguration message from the first BS on the SRB, wherein the first RRC Reconfiguration message configures a first data radio bearer (DRB);
   transmitting a first RRC Reconfiguration Complete message to the first BS on the SRB, in response to the first RRC Reconfiguration message;
   receiving a second RRC Reconfiguration message from the first BS on the SRB, wherein the second RRC Reconfiguration message configures a second DRB;
   transmitting a second RRC Reconfiguration Complete message to the first BS on the SRB, in response to the second RRC Reconfiguration message;
   receiving a third RRC Reconfiguration message from the first BS on the SRB, wherein the third RRC Reconfiguration message configures a local cache routing configuration;
   transmitting a third RRC Reconfiguration Complete message to the first BS on the SRB, in response to the third RRC Reconfiguration message;
   transmitting a first Protocol Data Unit (PDU) to the first BS on the first DRB, wherein the communication device indicates a local cache routing in a PDU header of the first PDU when the local cache routing configuration is configured by the BS; and
   transmitting a second PDU to the first BS on the second DRB, wherein the communication device does not indicate the local cache routing in the second PDU.

6. The communication device of claim 5, wherein the instructions further comprise:
   transmitting a RRC message to the first BS on the SRB, wherein the RRC message indicates a support of the local cache routing configuration or comprises a local cache routing request.

7. The communication device of claim 5, wherein the instructions further comprise:
   transmitting a third PDU to the first BS on the first DRB, wherein the communication device does not indicate the local cache routing in the third PDU when the local cache routing configuration is configured by the first BS and the communication device determines a packet in a data field of the third PDU to be routed by the first BS to a core network.

8. The communication device of claim 5, wherein the instructions further comprise:
   receiving a handover command for handing over the communication device from the first BS to a second BS, from the first BS; and keeping the local cache routing configuration in response to the handover command.

9. The communication device of claim 5, wherein the instructions further comprise:
receiving a secondary node (SN) RRC Reconfiguration message changing the communication device from connecting to the first BS to connecting to a third BS, from the first BS, when the communication device communicates with the first BS and a fourth BS; and
releasing the local cache routing configuration according to the SN RRC Reconfiguration message.

10. The communication device of claim 5, wherein the instructions further comprise:
performing a RRC connection reestablishment procedure according to a failure;
keeping the local cache routing configuration and suspending the first DRB, in response to the RRC connection reestablishment procedure; and
transmitting a fourth PDU to the first BS on the first DRB according to the local cache routing configuration after resuming the first DRB, wherein the communication device indicates the local cache routing in a PDU header of the fourth PDU.

\* \* \* \* \*